United States Patent [19]

Inagaki et al.

[11] Patent Number: 4,983,286

[45] Date of Patent: Jan. 8, 1991

[54] STERILIZING WATER-PURIFYING REAGENT FOR DRINK

[76] Inventors: Jitsuo Inagaki, 71, Aza Kamiyashiki, Itsusikicho, Hazugun, Aichi 444-04; Asao Shimanishi, 31-29-501, Toyo 5-Chome, Koto-ku, Tokyo, 135; Taisaburo Ono, 2-23-29, Nakahara, Hiratsuka-shi, Kanagawa, 254, all of Japan

[21] Appl. No.: 419,002

[22] Filed: Oct. 10, 1989

Related U.S. Application Data

[60] Division of Ser. No. 204,290, Jun. 9, 1988, abandoned, which is a continuation of Ser. No. 23,124, Jan. 21, 1987, abandoned.

[51] Int. Cl.$^5$ .................... B07D 29/27; C02F 1/50
[52] U.S. Cl. .................... 210/257.1; 210/281; 210/282; 210/419; 210/455; 210/482; 210/501
[58] Field of Search .................... 210/232, 665–668, 210/723, 764, 189, 192, 204, 235, 238, 248, 257.1, 264, 281, 282, 290–294, 416.3, 419, 433.1, 455, 456, 464, 470, 501, 502.1, 503

[56] References Cited

U.S. PATENT DOCUMENTS

| | | | |
|---|---|---|---|
| 3,539,049 | 11/1970 | D'Eustachio et al. | 210/482 X |
| 3,912,638 | 10/1975 | Beaubien | 210/482 X |
| 4,214,993 | 7/1980 | Forsythe, Jr et al. | 210/282 |
| 4,231,876 | 11/1980 | Zimmermann et al. | 210/482 X |
| 4,283,283 | 8/1981 | Zimmerman | 210/282 |
| 4,306,971 | 12/1981 | Hankammer | 210/282 |

Primary Examiner—Tom Wyse
Attorney, Agent, or Firm—Donald W. Hanson

[57] ABSTRACT

This invention provides a sterilizing water-purifying reagent for removing muddiness of water to be treated or sterilizing the water to be treated as drinking water in fields or under drinking water shortage environment, and the sterilizing water-purifying reagent comprises an acidic additive containing as main ingredients various types of metal salts and nonmetal salts produced by dissolving vermiculite weathered from mica mineral or soil further weathered from the vermiculite in aqueous inorganic acid solution.

18 Claims, 3 Drawing Sheets

STERILIZING WATER-PURIFYING REAGENT FOR DRINK

This application is a division of application Ser. No. 204,290, filed June 9, 1988, abandoned, which is a continuation of Ser. No. 023,124, filed Jan. 21, 1987, abandoned.

TECHNICAL FIELD

This invention relates to a sterilizing water-purifying reagent for drink for removing muddiness or sterilizing water to be treated to produce drinking water in the field or under a drinking water shortage situation.

BACKGROUND ART

As recently reported in the newspapers, not only food shortages but drinking water shortages have become serious problems in Africa. A shortage of water can be avoided by drinking water from rain or from a river, but disease or infectious illness may occur due to pathogenic bacteria contained in water. To remedy such problems, sterilizing water-purifying reagents for drink to produce drinking water are strongly recommended such in urgent emergencies so as to rescue human lives.

If water from rain or a river can be immediately purified for drinking water, much more is convenient even in field activity in fields such as a camp since it is not necessary to carry a canteen of heavy weight without limit of carriage.

A portable purifier is heretofore known, as disclosed, for example, in Japanese Patent Publication No. 40148/1977 official gazette, in which fluoride is added to water, fluoric ions are produced by ionization according to energization with a current, and bacteria contained in the water are sterilized to be purified by the fluoric ions thus produced. However, this purifier requires lumped or particular self-soluble electrode to be filled so as to flow a galvanic current as portable energizing means, which is expensive and cannot be employed as the sterilizing water-purifying reagent for drink to be supplied in large quantity to aid in Africa and the like as described above.

An object of this invention therefore is to provide a sterilizing water-purifying reagent for drink which is harmless for human body is capable of being inexpensively synthesized in industry and is excellent in removing muddiness and sterilizing bacteria.

Another object of the invention is to provide a sterilizing water-purifying reagent for drink capable of inexpensively producing a simple water purifier.

DISCLOSURE OF THE INVENTION

This invention relates to a sterilizing water-purifying reagent for drink comprising an acidic additive which contains, as main ingredients, various types of metal salts and nonmetal salts produced by dissolving vermiculite weathered from mica mineral or soil further weathered from the vermiculite a aqueous inorganic acid solution.

The acidic additive of the invention can insolubilize organic materials dissolved in sewage and sterilize bacteria.

The mica mineral used in the invention preferably employs black mica in view of the effect of insolubilization and agglomeration of organic materials. That is, the vermiculite of black mica and soil further weathered from the vermiculite of black mica is most preferable as raw materials.

To produce the sterilizing water-purifying reagent for drink of the invention, a 25% aqueous sulfuric acid solution is, for example, added to the vermiculite weathered from black mica at a ratio of 4:3 to 4 of the vermiculite : aqueous sulfuric acid solution by weight, and the mixture is allowed to stand for several days while sometimes stirring the mixture, or the mixture is heated to 100° C. and allowed to stand for several hours while agitating the mixture. Thus, the elements such as Si, Al, Mg, Fe, K and Na, and the oxides thereof in the raw material are eluated in the aqueous sulfuric acid solution to produce sulfates, oxides, double salts and complex salts of the metals and nonmetals. In addition, small amounts of sulfates of Li, Zr, V, Ni, Co, P, Ba and S contained as elements or oxides in the raw material are also produced, but no detrimental heavy metals are contained. The aqueous solution thus produced is used as is or by concentrating or diluting the solution as sterilizing water-purifying reagent for drink. When 25% hydrochloric acid is used instead of 25% sulfuric acid and vermiculite is added at a ratio of 1:1 to the hydrochloric acid by weight and the mixture is then similarly reacted, the sterilizing water-purifying reagent for drink ( sold in the name of "ENMINERA" by KABUSHIKIKAISHA ENMINERA ) having similar action can be produced. In this case, there is an advantage that the reaction time can be largely shortened.

In order to purify water from rain or a river for drinking purposes, the following treatments must be at least conducted.

(1) Filtration of rough dusts
(2) Removal of suspension substances (SS)
(3) Removal of soluble organic substances: These organic substances are dissolved in water to be purified due to the decomposition of general vegetable or animal organic substances. In other words, the organic substances saccharide, carbohydrates such as organic acids, protein or amino acid as modified derivatives thereof, oil and fat and fatty acids as modified derivatives thereof soluble in water which vegetable or animal organic substances are decomposed.
(4) Sterilization: Since large types of bacteria existing in the natural world are presented indispensably in water to be purified, as many as possible of the bacterias must be sterilized.

When the sterilizing water-purifying reagent of the invention is added to water to be purified, the reagent immediately reacts with organic substances in the water to be decomposed while producing carbon dioxide gas to alter the decomposed organic substances to those having properties insoluble in water, thereby precipitating and agglomerating the substances. Simultaneously, it is also proved that visible suspended substances (SS) are also agglomerated and the reaction causes a strong sterilizing effect. Flock thus precipitated and agglomerated can be filtered by filter paper.

As described above, since the sterilizing waterpurifying reagent of the invention is added to simultaneously perform (3), the removal of the soluble organic substances, and (4), the sterilization, the raw water to be purified can be purified to drinking water by providing means for mixing or contacting the sterilizing water-purifying agent of the invention with the raw water to be purified and means for filtering the resultant agglomerates and insoluble substances. Therefore, when a sterilizing water-purifying chamber and a filtering chamber are separately or integrally provided in a vessel, the raw water to be treated can be purified.

The amount of the sterilizing water-purifying reagent added to the raw water to be treated depends upon the degree of pollution of the raw water to be treated, but is generally approximately 1/10,000 to 1/5,000 (100 to 200 ppm) to the raw water to be treated. Adding more than this amount does not cause detriment, but excessive additions cause a decrease in the pH of the water. Therefore, it is preferable to neutralize the water with lime water or a dilute caustic soda solution. When 100 to 200 ppm of lime water or caustic soda is added, the water becomes almost neutral to a pH of 6 to 7 but it is preferable to ideally neutralize the water to a pH 7. The agglomerating effect is also enhanced by the neutralization.

Small amounts of ionized substances are contained in some water to be treated. Such ions include cations of ammonia, calcium, manganese, or ions of chlorine, fluorine, nitric acid, and nitrous acid. In this situation, ionizing substance removing means is required in addition to the sterilizing water-purifying reagent means and the filtering means. For example, to remove anions, an active charcoal filtering layer is provided, and to remove cations, a vermion filtering layer is provided. Vermion is a strong inorganic cation exchanger produced by subjecting vermiculite ore of South Africa to an inorganic chemical treatment. The exchange capacity of the vermion is, for example, approx. 2,000 meq (milli-equivalent) to ammonia ion. The ionized substance removing means may use other known materials such as ion exchange resins and be within the scope of the invention.

Some water to be treated is slightly colored or generates an odor. In this case, decoloring or deodoring means is required. This means includes an active charcoal filtering layer.

When the sterilizing water-purifying reagent of the invention is used, a portable water purifier can be readily provided.

More specifically, the water purifier may have a chamber for mixing the raw water to be treated and the sterilizing water-purifying reagent of the invention and a filtering chamber. Thus, when the mixture of the raw water to be treated and the sterilizing water-purifying reagent is conducted in with another vessel, the water purifier may have only the filtering chamber. The filtering chamber may have only filter paper, but to eliminate clogging of the filter paper, which delays the filtering velocity, a suitable filler layer is preferably provided on the filter paper. The filler may include, for example, active charcoal, vermion, silica, alumina, zeolite, china clay, bentonite, kaolin, baked chaff carbon all to be used for this purpose. A preferable example of the filtering chamber has a mixture chamber of active charcoal and vermion, a vermion chamber and an active charcoal chamber sequentially stacked form the bottom, and filtering chambers filled with filter paper disposed at the upper and lower ends. The filler to be filled in the filtering chamber is preferably all enclosed with nonwoven fabric of Rayon cloth which is not corroded at all. Thus, when the effect is reduced, the filler may be simply exchanged. When this filtering chamber is used, most raw water to be treated can be ideally purified. The purified water may be dropped in a cup disposed at the bottom, or provided with a chamber for receiving the water at the lower end of the filtering chamber. The chamber for mixing the raw water to be treated and the sterilizing water-purifying reagent of the invention may be formed of separate vessels or formed integrally with the upper end of the filtering chamber.

In this latter case, the mixing chamber is preferably constructed not to flow down the water to be treated to the filtering chamber disposed thereunder at mixing time but to be opened by known means to flow down the treated water to the lower filtering chamber.

The sterilizing water-purifying reagent of the invention can purify water from a pond, swamp, lake or water from rain on the road for drinking purposes. The acidic additive of the invention can be used as precipitating agglomerate which purifies toxic waste water such as industrial waste water or animal urine waste water of high degree of pollution to insolubilize the organic substances dissolved in the water, thereby precipitating and agglomerating the substances.

BEST MODE FOR CARRYING OUT THE INVENTION

EXAMPLE 1

0.5 ml of water-purifying reagent of the invention was added as 25% aqueous sulfuric acid solution extract to 500 cc (containing approx. 500 pieces/cc of colibacillus) of rain water which contained colibacillus, the mixture was then stirred, passed through filter paper. When the filtrate was sampled to test a Colibacillus test, the colibacillus was reduced to less than 13 pieces/cc.

EXAMPLE 2

0.1 vol.% of 25% aqueous sulfuric acid solution extract was added to water of a river which contained colibacillus and organic substances, the mixture was neutralized with CaO, filtered through a vermion layer, and the filtrate was sampled and tested. The result was as in the following Table

| Measured items | Water to be treated | Treated water |
| --- | --- | --- |
| Colibacillus (pieces/cc) | 1200 | 29 |
| BOD (ppm) | 2100 | 34 |
| SS (mg/ml) | 3800 | less than 1 |
| n-hexane extract | 2520 mg/ml | 4 mg/ml |

An embodiment of a water purifier which employs the sterilizing water-purifying reagent of the invention will be described hereinafter.

Figure 1:
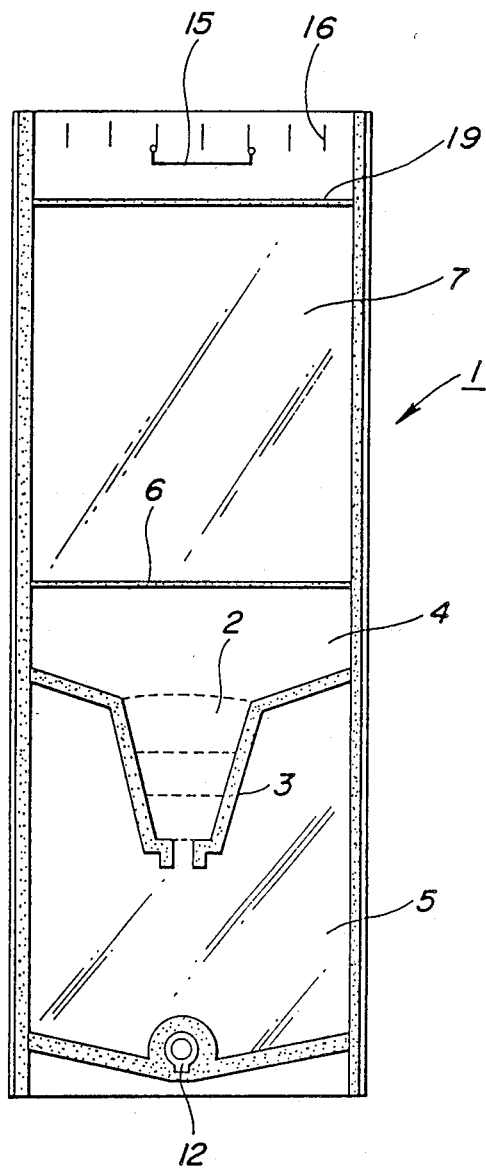
FIG. 1 is a front view of a purifier using a sterilizing water-purifying reagent of the invention.

FIG. 1 is a sectional view showing a water purifier which uses the sterilizing water-purifying reagent of the invention. A simple water purifier body 1 of rectangular shape open at the top is formed by heat sealing or sealing with high frequency wave a transparent or translucent plastic film or sheet. A funnel type holder 3 for detachably holding a filter bag 2 is coupled with the body in the purifier body 1. A raw water containing chamber 4 and a water purifying chamber 5 are respectively formed at the top and bottom of the holder 3, and a sterilizing, precipitating and agglomerating chamber 7 is formed through switching means 6 at the top of the chamber 4.

The switching means 6 may employ known means such as for engaging an uneven portion formed, for example, at the inner surface or fixing a sheetlike magnet or a perchlorifastener (magic fastener).

Figure 2:
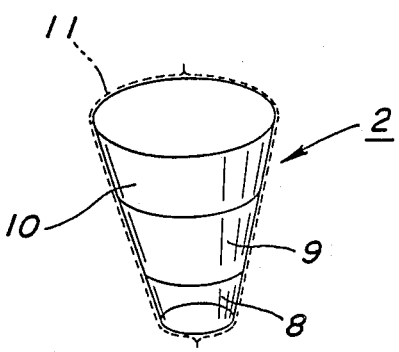
FIG. 2 is a perspective view of a filtering material bag.

The filter bag 2 is constructed in the above embodiment by enclosing a laminate of filter fiber 8, active charcoal 9 and vermiculite 10 weathered from mica mineral sequentially stacked as shown in FIG. 2 with filter paper 11. However, the invention is not limited to the particular embodiment. For example, one or more layers of fillers such as charcoal and silica and filter paper may be combined to be suitably used.

The sterilizing, precipitating and agglomerating chamber 7 is for adding the sterilizing water-purifying reagent of the invention to the water to be treated so as to sterilize, precipitate and agglomerate the water to be treated.

Figure 3:
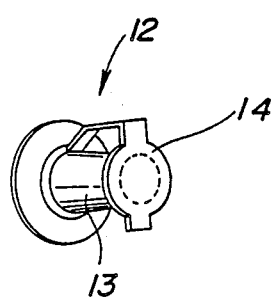
FIG. 3 is a perspective view of a drinking water outlet.
Figure 4:
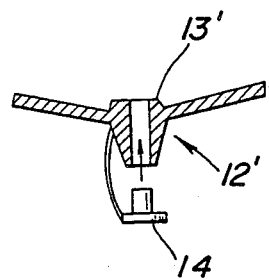
FIG. 4 is a perspective view illustrating other example of the drinking water outlet.

An outlet 12 for producing purified water as drinking water is formed at the lower end side of the water purifying chamber 5. The outlet is formed, as shown in FIG. 3, laterally engaging a lateral outlet 13 with the projection of a plug 14. However, the invention is not limited to this particular example. For example, as shown in FIG. 4, the projection of a downward plug 14' is engaged with a drinking water outlet 13' at the bottom of the bag-like water purifier body.

A hole 15 for grasping the purifier by hand and a hole 16 for hanging the purifier by inserting a rod are formed at the top of the sterilizing, precipitating and agglomerating chamber 7. Since strong force is applied to the holes 15 and 16 and the top end formed at the holes, the holes and the top end are preferably constructed of high strength.

In the embodiment described above, switching means 19 similar to the switching means 6 is formed at the top of the chamber 7. The switching means 19 is provided to eliminate dust from entering the purifier body by closing it after the filtering is finished, but is not always necessary in the invention.

Figure 5:
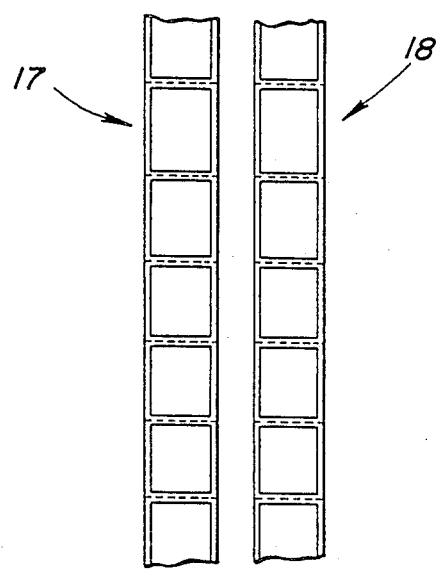
FIG. 5 is a front view of continuous bags of predetermined quantities of sterilizing water-purifying reagent and chlorine sterilizer.

In order to purify raw water to be treated by the simple water purifier of the invention, the switching means 6 is first closed to form the sterilizing, precipitating and agglomerating chamber 7, and the raw water to be treated is filled therein. As shown in FIG. 5, one bag of continuous bags 17 which contain predetermined quantities of sterilizing, precipitating and agglomerating reagents is separated, filled in the water to be treated, and one of continuous bags 18 which seal predetermined quantities of chlorine sterilizer like bleaching powder is then separated and filled into the water to be treated. Further, it is preferable to fill a neutralizer such as CaO sealed in a predetermined quality into the water to be treated. The quantities of the sterilizing, precipitating and agglomerating reagents and the neutralizer of continuous bags are, of course, determined in optimum amounts to be decided in response to the quantity of the raw water to be treated and presumed in advance. Thus, organic substances in the water to be treated are decomposed while generating carbon dioxide gas, the decomposed organic products are insolubilized, precipitated and agglomerated. The sterilizing effect is performed by the reaction.

Figure 6:
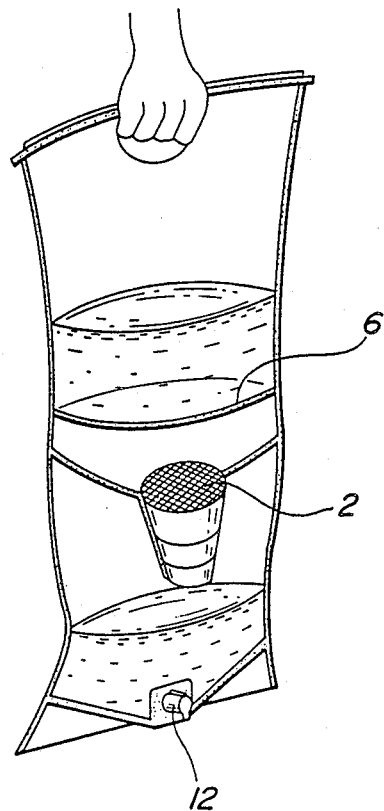
FIG. 6 is a perspective view illustrating the used state of the purifier of the invention.

After the reaction is finished, the switching means 6 is opened, and the water is filtered through the filter bag 2 as shown in FIG. 6. The water purifier is preferably carried by hand during the filtering as shown in FIG. 6, or hung by a rod. After the filtering, the purified water is then exhausted from the outlet 12 of the bottom of the purifier into a suitable vessel for drinking.

INDUSTRIAL APPLICABILITY

As described above, the sterilizing water-purifying reagent of the invention provides excellent effects of sterilizing bacteria, decomposing organic substances and agglomerating the substances as compared with the conventional sterilizing water-purifying reagent of this type. Further, the sterilizing water-purifying reagent of the invention can be very less expensively produced, and can readily purify water from rain or a river substantially only by the sterilizing water-purifying reagent. Therefore, when the sterilizing water-purifying reagent of the invention is used, a simple water purifier can be readily fabricated very inexpensively. Thus, the simple water purifier can be conveniently utilized in an area of drinking water shortages like in Africa or in the field activity in a camp.

We claim:

1. A portable water purifier for producing drinking water comprising a water purifier body of plastic film or sheet, the body open at the top and formed by heat sealing or high frequency wave sealing of the plastic film or sheet, and
    a funnel type holder for detachably holding a filter bag connected with the inner periphery of the water purifier body,
    a filter bag containing filtering material, the filter bag being supported by the funnel type holder,
    a section of the body above the funnel type holder being a raw water containing chamber and a section of the body below the funnel type holder being a purified water containing chamber,
    the upper portion of said raw water containing chamber being separated into two chambers including a sterilizing, precipitating and agglomerating chamber and a second chamber by switching means located at the bottom of the sterilizing, precipitating and agglomerating chamber, said switching means for opening and closing the sterilizing, precipitating and agglomerating chamber relative to the second chamber,
    the sterilizing, precipitating and agglomerating chamber containing a sterilizing water-purifying reagent, and
    the purified water containing chamber being generally closed and having an openable and closable outlet near the bottom of the chamber.

2. A portable water purifier according to claim 1, wherein said sterilizing water-purifying reagent includes an acidic additive containing as main ingredients various types of metal salts and nonmetal salts produced by dissolving vermiculite weathered from mica mineral in aqueous inorganic acid solution.

3. A portable water purifier in accordance with claim 1 further including a hole in the body near the upper portion of the sterilization, precipitating and agglomerating chamber for supporting the water purifier body on an object.

4. A portable water purifier in accordance with claim 3 wherein the open top of the body includes a second switching means for opening and closing the top of the raw water containing chamber.

5. A portable water purifier in accordance with claim 4 wherein the filter bag includes filter paper and one or more layers of filter material.

6. A portable water purifier in accordance with claim 5 wherein the filter material is selected from the group consisting of active charcoal, vermion, silica, alumina, zeolite, china clay, bentonite, kaolin and baked chaff carbon.

7. A portable water purifier according to claim 6, wherein said sterilizing water-purifying reagent includes an acidic additive containing as main ingredients various types of metal salts and nonmetal salts produced by dissolving vermiculite weathered from mica mineral in aqueous inorganic acid solution.

8. A portable water purifier according to claim 5, wherein said sterilizing water-purifying reagent includes an acidic additive containing as main ingredients various types of metal salts and nonmetal salts produced by dissolving vermiculite weathered from mica mineral in aqueous inorganic acid solution.

9. A portable water purifier in accordance with claim 1 wherein the open top of the body includes a second switching means for opening and closing the top of the raw water containing chamber.

10. A portable water purifier in accordance with claim 1 wherein the filter bag includes filter paper.

11. A portable water purifier in accordance with claim 10 wherein the filter bag includes one or more layers of filter material selected from the group consisting of active charcoal, vermion, silica, alumina, zeolite, china clay, bentonite, kaolin and baked chaff carbon.

12. A portable water purifier according to claim 11, wherein said sterilizing water-purifying reagent includes an acidic additive containing as main ingredients various types of metal salts and nonmetal salts produced by dissolving vermiculite weathered from mica mineral in aqueous inorganic acid solution.

13. A portable water purifier in accordance with claim 1 wherein the filter bag includes one or more layers of filter material selected from the group consisting of active charcoal, vermion, silica, alumina, zeolite, china clay, bentonite, kaolin and baked chaff carbon.

14. A portable water purifier in accordance with claim 1 wherein the outlet includes a lateral outlet tube with an engaging plug.

15. A portable water purifier in accordance with claim 14 further including a hole in the body near the upper portion of the sterilizing, precipitating and agglomerating chamber for supporting the water purifier body on an object.

16. A portable water purifier in accordance with claim 15 wherein the open top of the body includes a second switching means for opening and closing the top of the raw water containing chamber.

17. A portable water purifier in accordance with claim 16 wherein the filter bag includes filter paper and one or more layers of filter material.

18. A portable water purifier in accordance with claim 14 wherein the open top of the body includes a second switching means for opening and closing the top of the raw water containing chamber.

* * * * *